(12) United States Patent
Pudenz

(10) Patent No.: US 9,830,547 B2
(45) Date of Patent: Nov. 28, 2017

(54) ANTENNA FOR AN RFID READING APPARATUS AND METHOD FOR TRANSMITTING AND/OR RECEIVING RFID SIGNALS

(71) Applicant: SICK AG, Waldkirch (DE)

(72) Inventor: Florian Pudenz, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/437,013

(22) Filed: Feb. 20, 2017

(65) Prior Publication Data

US 2017/0255853 A1    Sep. 7, 2017

(30) Foreign Application Priority Data

Mar. 7, 2016 (EP) .................... 16158873

(51) Int. Cl.
*G06K 19/00* (2006.01)
*H01Q 7/08* (2006.01)
*G06K 19/07* (2006.01)
*G06K 19/077* (2006.01)

(52) U.S. Cl.
CPC ... *G06K 19/0726* (2013.01); *G06K 19/07779* (2013.01)

(58) Field of Classification Search
CPC .................. H01Q 9/16; H01Q 7/08
USPC ............ 343/797, 788, 822; 235/492
See application file for complete search history.

(56) References Cited

U.S. PATENT DOCUMENTS

| | | | |
|---|---|---|---|
| 6,486,848 B1 * | 11/2002 | Poilasne | H01Q 9/16 343/797 |
| 8,963,794 B2 | 2/2015 | Zhu et al. | |
| 2009/0140946 A1 | 6/2009 | Ziolkowski | |
| 2010/0201578 A1 | 8/2010 | Parsche | |
| 2011/0018774 A1 | 1/2011 | Kikin | |
| 2015/0311600 A1 | 10/2015 | Singh et al. | |

FOREIGN PATENT DOCUMENTS

EP    2284951 A1    2/2011

OTHER PUBLICATIONS

European search report dated Aug. 31, 2016 for corresponding application 16158873.6.
Huang, John; "A Technique for an Array to Generate Circular Polarization with Linearly Polarized Elements"; IEEE Transactions on Antennas and Propogation; (Sep. 1, 1986) pp. 1113-1124.
Office Action dated Jul. 5, 2017 issued in corresponding European Application No. 16 158 873.6.

* cited by examiner

*Primary Examiner* — Daniel Hess
(74) *Attorney, Agent, or Firm* — Nath, Goldberg & Meyer; Jerald L. Meyer

(57) ABSTRACT

An antenna (100) for an RFID reading apparatus is provided having at least one single CLL antenna (10), wherein a single CLL antenna (10) is an antenna that has an inner antenna loop (12) and a capacitively loaded antenna loop (14) which surrounds the inner antenna loop (12) and into which a capacitance (16 is introduced. In this respect, the antenna (100) has a plurality of single CLL antennas (10a-d) that are differently oriented and has a feed circuit (26) to operate the single CLL antennas (10a-d) for generating a circular polarization with a respective phase offset.

20 Claims, 6 Drawing Sheets

Figure 1:
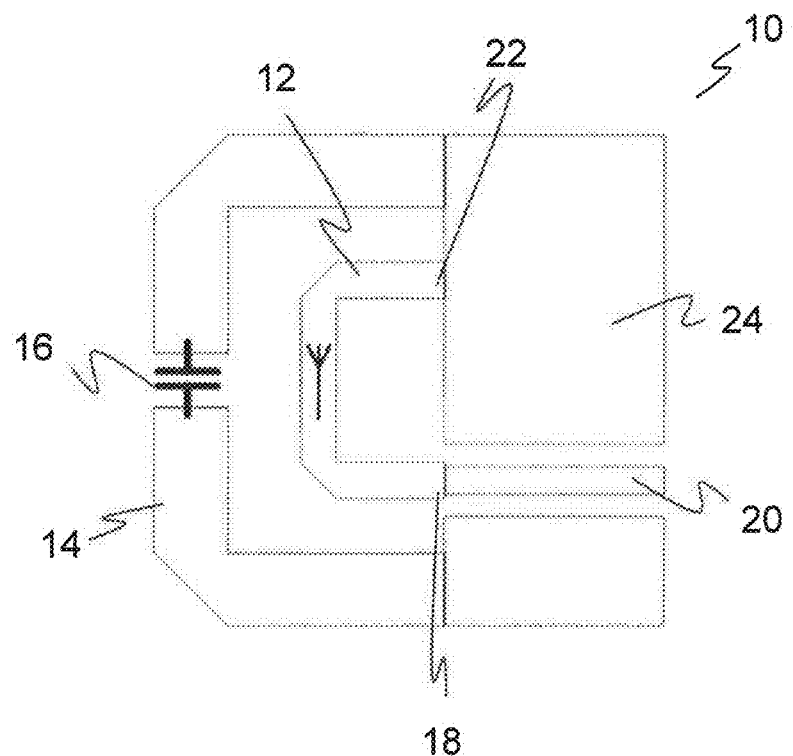

ANTENNA FOR AN RFID READING APPARATUS AND METHOD FOR TRANSMITTING AND/OR RECEIVING RFID SIGNALS

The invention relates to an antenna for an RFID reading apparatus and to a method for transmitting and/or receiving RFID signals in accordance with the preambles of claims 1 and 20 respectively.

RFID reading apparatus serve for the identification of objects and products and are used inter alia to automate logistical movements. RFID transponders fastened to the products are read out at an identification point, above all on a change of the owner of the product or on a change of the transport means, and information is optionally written back in the transponder. The detected information is used to control the forwarding and sorting of goods and products. Important applications for automatic identification are logistical distribution centers, for instance of package shippers, or the baggage check-in at airports.

The RFID reading apparatus excites RFID transponders located in its reading range by electromagnetic radiation via its antenna to emit the stored information, receives the corresponding transponder signals and evaluates them. For this purpose, the UHF (ultra-high frequency) range is frequently used since there is an established framework here with the standard ISO 18000-6 and in addition transponders can be read out at different distances from some millimeters up to several meters. UHF RFID transponders are available in very compact construction designs and can also accordingly be attached to very small objects. RFID reading apparatus in the UHF range are, however, not usable for a number of applications, for example in a milling machine for recognizing the milling tools used, in the currently available construction designs due to the housing size.

There is therefore a need for particularly compact construction designs of the antennas that take up as little construction space as possible within the RFID reading apparatus. The required antenna size generally depends on the frequency, however. This is in turn not a free parameter since, for example, a frequency range between 850 MHz and 950 MHz is provided for UHF, within which range frequencies are used which are determined for specific countries. An antenna for an RFID reading apparatus can therefore not easily adopt a base surface of less than $\lambda/4 \times \lambda/4$, where $\lambda$ is the wavelength of the RFID signal.

It is admittedly conceivable in some applications to work with very small external antennas; however, this means an additional installation effort. In addition, known antennas for the RFID range that allow a smaller housing size than $\lambda/4$ at all are linearly polarized or have such a small antenna gain that transponders can only be read in direct contact or at best up to a distance of some few centimeters. However, circularly polarized antennas are preferably used in RFID reading apparatus to supply transponders with energy in all angular positions and to read them out. A further demand on the antenna is robustness with respect to interference in the environment such as metal surfaces next to or behind the RFID reading apparatus or additional dielectrics directly in front of the antenna. There are no antennas that combine these criteria within themselves.

Structures are described in US 2009/0140946 A1 that allow the design of very compact antennas. An antenna loop shorted with ground is surrounded by an electrical conductor called a CLL (capacitively loaded loop). The electrical conductor is called capacitively loaded because a capacitance is introduced there. This capacitance in the direct near field of the antenna loop makes it possible to significantly reduce the resonant frequency of the structure. An additional matching network required for conventional antennas can be dispensed with and a considerably smaller design can thereby be achieved.

The functional principle in this respect is as follows: The time change of a transmitted signal applied to the antenna produces a change in the magnetic field. This magnetic flux is received and amplified (resonance magnification) by the CLL. The current induced in the two arms of the CLL generates a high voltage difference at the capacitive element. The capacitance stored in the electrical field is large enough on a correct dimensioning to compensate the inductance of the two coils formed by the antenna loop and the CLL. The behavior is reminiscent of an RLC resonant circuit. The size of the two conductor loops is naturally an important factor for the resonant frequency, for as the resonant frequency increases, the size of the structure decreases due to the smaller wavelength. The size ratio of the outer coil to the inner coil is, however, also important for the coupling of the two coils to one another.

Similar very compact antenna structures are known from the patent application U.S. Pat. No. 8,963,794 B2.

Construction designs are accordingly known that are considerably more compact than previously known patch antennas, rod antennas or frame antennas. The matching and thus also the possible bandwidth of the antennas is, however, influenced by the available ground plane (groundplane) of the antenna. A compact device would, however, also only offer a small ground plane. The bandwidth of the antenna shapes shown would thus not be sufficient for numerous applications in the UHF RFID range. In addition, the presented particularly compact antennas are also linearly polarized.

It is therefore the object of the invention to provide a robust and compact antenna for an RFID reading apparatus.

This object is satisfied by an antenna for an RFID reading apparatus and by a method for transmitting and/or receiving RFID signals in accordance with claims 1 and 20 respectively. The antenna is based on a single CLL antenna whose design is oriented on the concepts presented above within the framework of the discussion of the prior art. A single CLL antenna is therefore understood as an antenna that has an inner antenna loop and a capacitively loaded conductor loop (CLL) which surrounds the inner antenna loop and into which a capacitance is introduced. In this respect, the term loop is to be understood topologically as usual in antenna technology, that is it also allows non-round shapes such as rectangles. The invention now starts form the basic idea of connecting a plurality of single CLL antennas together to obtain an antenna suitable for RFID. For this purpose, at least two single CLL antennas are oriented differently and are operated with a phase offset such that a circularly polarized antenna is produced overall.

The invention has the advantage that a compact circularly polarized antenna can be set up that can in particular also achieve a base surface$<\lambda/4 \times \lambda/4$. The antenna properties can be matched very simply and precisely to their respective environmental conditions by coordinating the capacitance values of the single CLL antennas, for example on an installation on a metal plate.

The plurality of single CLL antennas are preferably of the same construction among one another. Manufacturing costs are thereby reduced and the behavior of the antenna is easier to manage overall.

The single CLL antenna preferably has a ground plane that is connected to the inner antenna loop and/or to the surrounding conductor loop. The single CLL antenna accordingly has its own ground plane.

The inner antenna loop is preferably of U shape, with a first end point being connected to a feed line and a second end point being connected to a ground plane. The inner antenna loop is accordingly half a loop of approximately 180° that is fed at the one end and that is shorted to a ground plane common to a separate single CLL antenna or to a plurality of single CLL antennas.

The surrounding capacitively loaded conductor loop is preferably of U shape and is connected to a ground plane at both end points. The topology, in particular also the geometry, of the surrounding conductor loop having half a loop of approximately 180° thus in particular corresponds to an increase in the size of the inner antenna loop. The surrounding conductor loop is connected at both end points to a separate ground plane of the single CLL antenna or to a ground plane common to a plurality of single CLL antennas.

The capacitance introduced into the surrounding capacitively loaded conductor loop is preferably electrically adjustable. It therefore has a capacitance value that can be varied by control and via which the resonant frequency can be coordinated in ongoing operation. A larger frequency band is thus covered; in the ideal case all globally used RFID frequency bands or a least the UHF RFID frequency bands using only one construction design. Examples of suitable components are a varactor diode or a digitally controllable integrated capacitor circuit. Alternatively, a fixed capacitance in the form of a static capacitor element or of a gap in a surrounding conductor loop configured at least partly as a metal surface is also conceivable. The matching of the resonant frequency is then, however, only possible once per design and no longer dynamically possible in operation.

The inner antenna loop and the surrounding capacitively loaded conductor loop of the single CLL antenna are preferably arranged in a plane. The single CLL antenna thus has a planar, practically two-dimensional shape. If the single CLL antenna has a separate ground plane, the latter is also preferably planar and lies in the same plane.

The plurality of single CLL antennas are preferably arranged on a common base surface. This is first to be understood geometrically as a common plane. The base surface is, however, again preferably also a ground plane in the technical antenna sense having corresponding conductive connections of the inner antenna loops and of surrounding conductor loops or, where present, of the ground planes of the single CLL antennas.

The antenna preferably has two single CLL antennas that are each oriented at an angle of 90° with respect to one another, wherein a feed circuit operates the two single CLL antennas with a respective phase offset of 90°. The circular polarization is thereby achieved with only two single CLL antennas. The feed circuit or the feed network preferably only has a 90° power divider (power splitter) and is accordingly simple and compact.

Alternatively, the antenna has four single CLL antennas that are each oriented at a respective angle of 90° with respect to one another, wherein the feed circuit operates the single CLL antenna with a respective phase offset of 90°. The single CLL antennas are arranged, for example, in a quadrangle that can be formed by a common ground plane. They are operated at the suitable phases of 0°, 90°, 180° and 270°. The feed network preferably has a plurality of 90° power dividers, in particular three 90° power dividers.

The single CLL antennas are preferably each aligned perpendicular to a plane and in the shape of a cross with respect to one another. This vertical alignment takes up a particularly small volume for the antenna in the RFID reading apparatus.

The single CLL antennas are preferably arranged in one plane. It is in this respect again preferably the plane of a common ground plane. The horizontal alignment is an alternative in which the total antenna can be configured as substantially planar.

The antenna is preferably right-hand circularly polarized and the single CLL antennas are thus oriented toward a common base surface such that the first end point is spaced further away from the base surface than the second end point. The antenna is alternatively left-hand circularly polarized and the single CLL antennas are oriented toward the common base surface such that the first end point is spaced closer away from the base surface than the second end point. These embodiments are based on the recognition that the axial ratio can be improved, i.e. reduced, when the single CLL antennas are oriented in a specific manner with respect to the common base surface depending on the hand direction of the polarization. Whether the feed point of the inner antenna loop lies above or beneath its connection to the ground plane therefore has an influence on the axial ratio. The single CLL antennas figuratively stand in respective embodiments for one of the two hand directions of the polarization with respect to the other hand direction and which orientation of the single CLL antennas is the more advantageous, that is upside down or not, is important for the desired hand direction.

The capacitance of the surrounding capacitively loaded conductor loop of at least one single CLL antenna is preferably detuned, in particular maximally detuned, to vary the polarization. One or more single CLL antennas can be attenuated or even practically switched off with respect to a relevant resonant circuit by a strong detuning. This then correspondingly influences the polarization and allows its matching in operation.

In an embodiment having four single CLL antennas, the capacitance of the surrounding capacitively loaded conductor loop of two diagonally oppositely disposed single CLL antennas is preferably detuned, in particular maximally detuned, to set an elliptical polarization. This is a special case of the attenuation or switching off of single CLL antennas and it allows a switching over between circular polarization and elliptical polarization, i.e. approximately linear polarization. Such a change between circular, horizontal and vertical polarization offers the advantage of preselecting individual transponders in specific applications having a defined alignment by a direct matching of the polarization.

In a preferred further development, an RFID reading device having at least one antenna in accordance with the invention for transmitting RFID signals to an RFID transponder and/or for receiving RFID signals from an RFID transponder is provided, with the RFID reading device furthermore having an evaluation unit for encoding RFID information into the RFID signals and/or for reading RFID information out of the RFID signals. The antenna allows a particularly compact construction shape of the RFID reading device while continuing to cover the required frequency band, for example in the UHF range. Such an RFID reading apparatus is preferably used in stationary installation at a reading zone of a conveyor or of a reading portal for reading out at least one RFID transponder moved on the conveyor or through the reading portal.

The method in accordance with the invention can be further developed in a similar manner and shows similar advantages in so doing. Such advantageous features are described in an exemplary, but not exclusive manner in the subordinate claims dependent on the independent claims.

Figure 2:
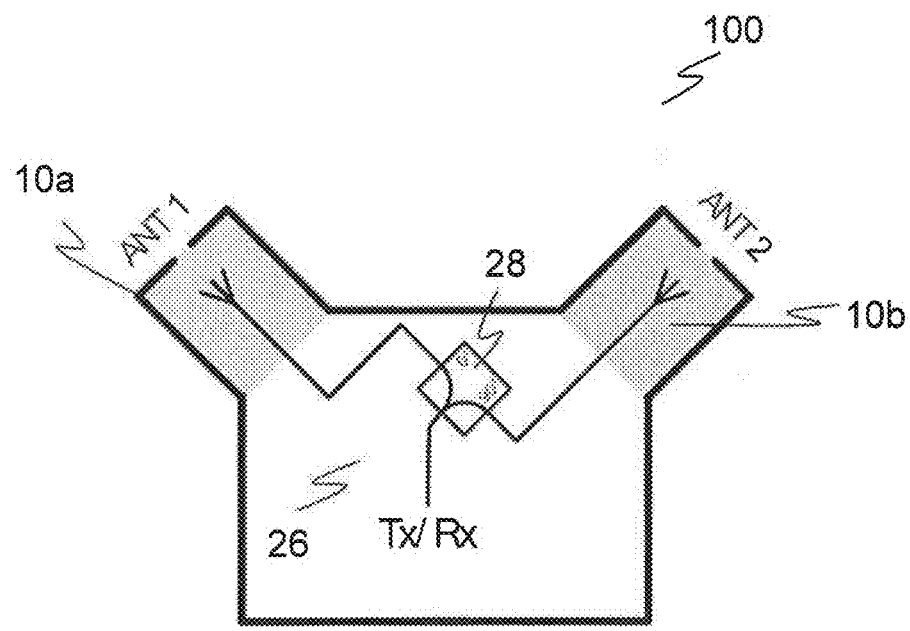
Figure 3:
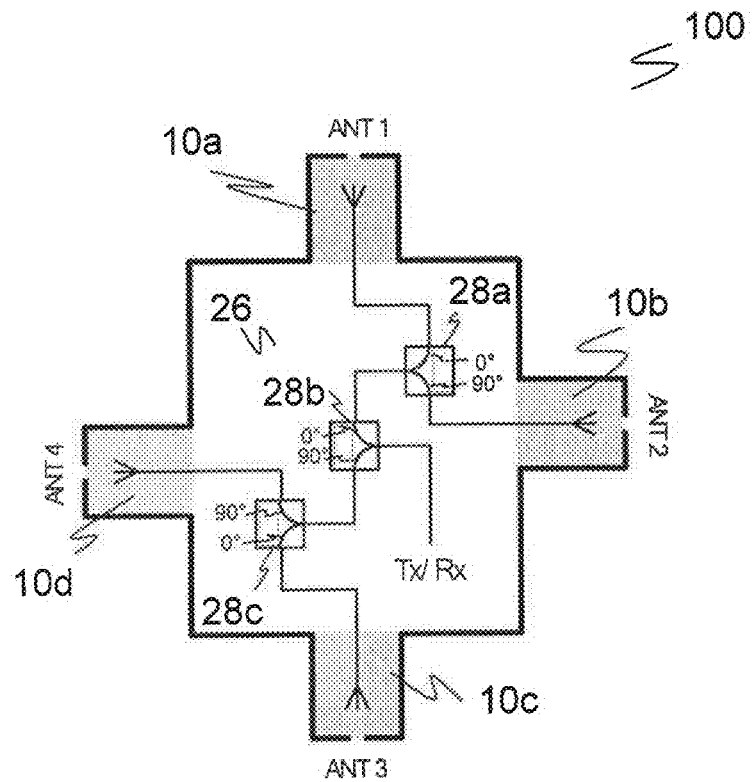
Figure 4:
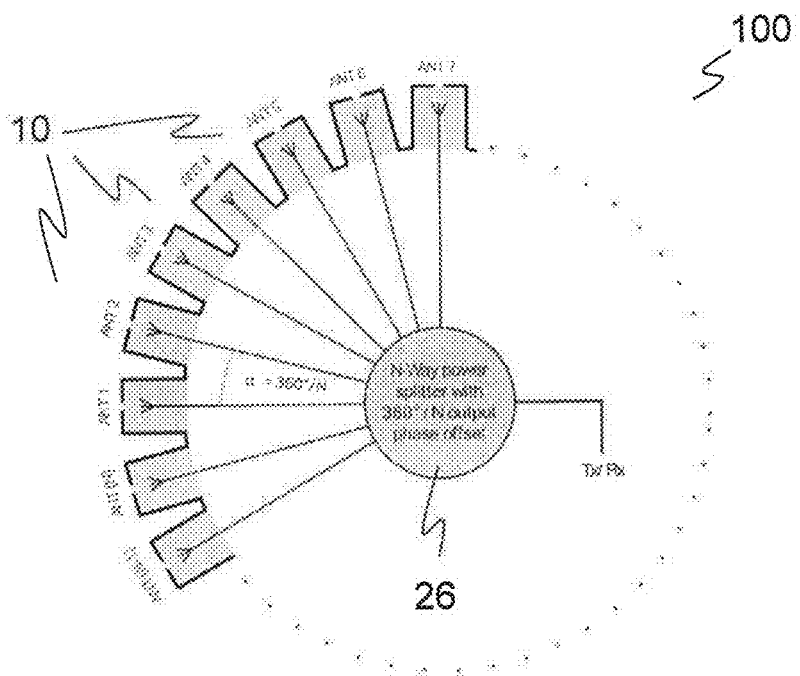
Figure 5:
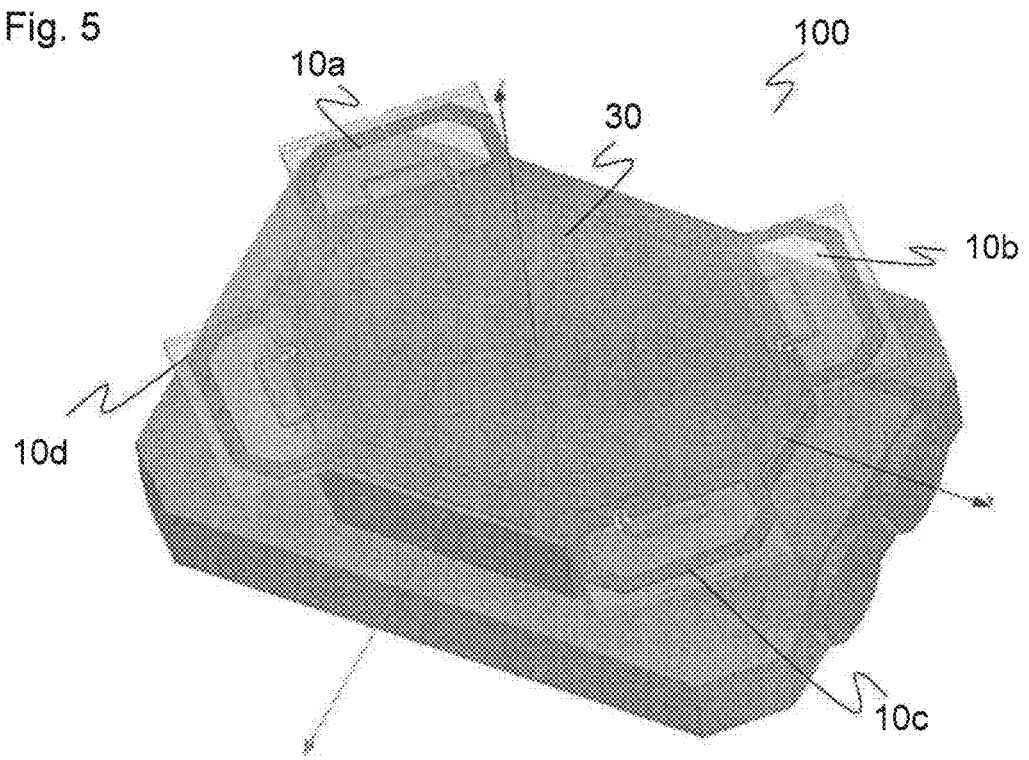
Figure 6:
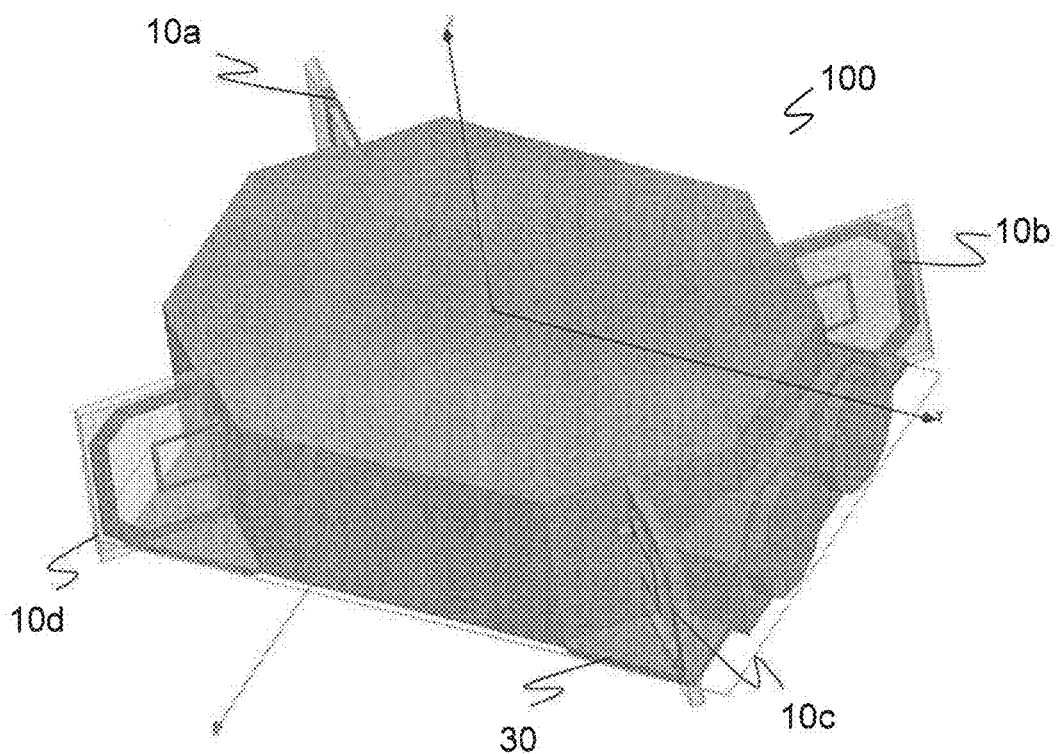
Figure 7:
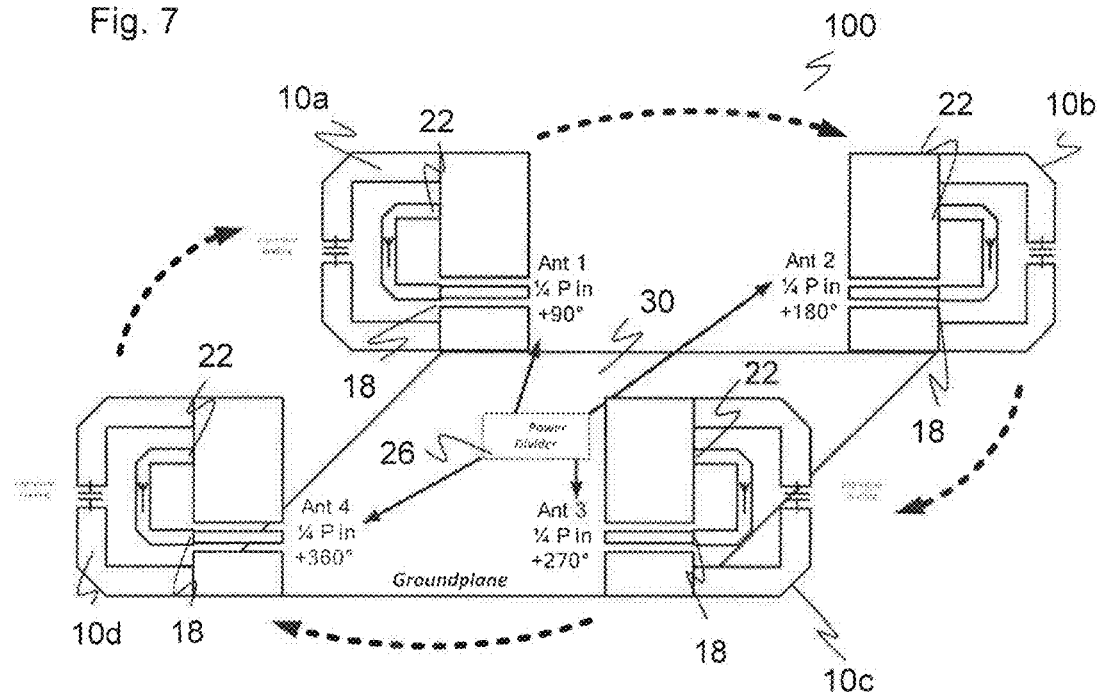
Figure 8:
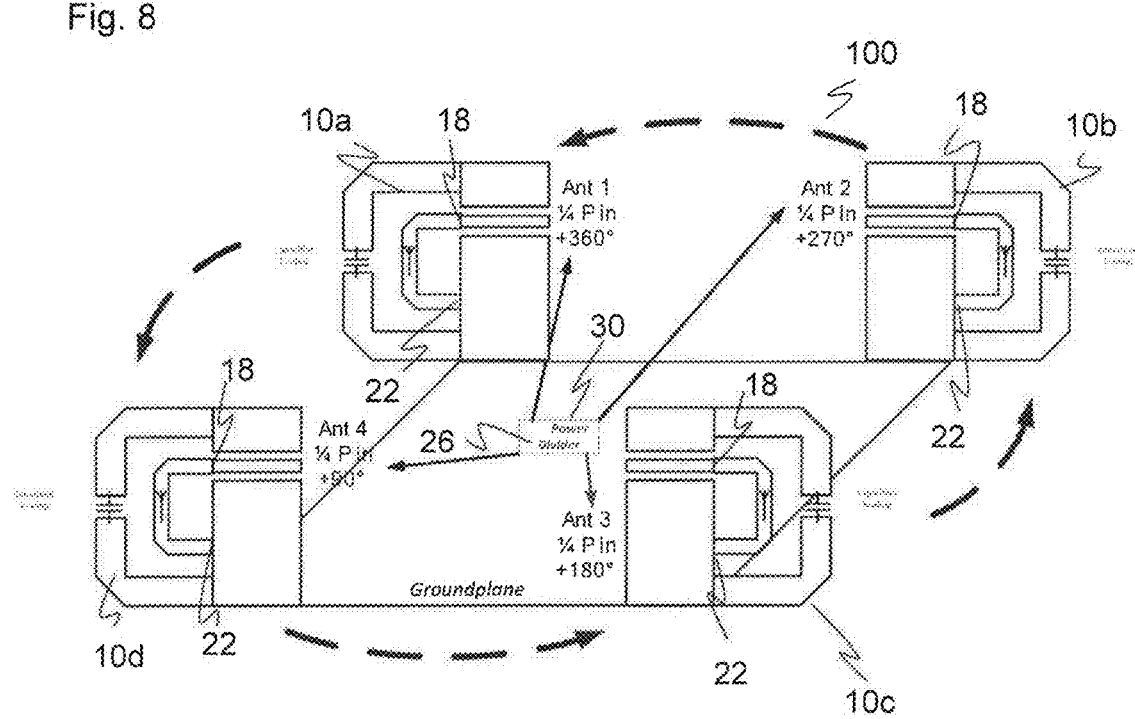
Figure 9:
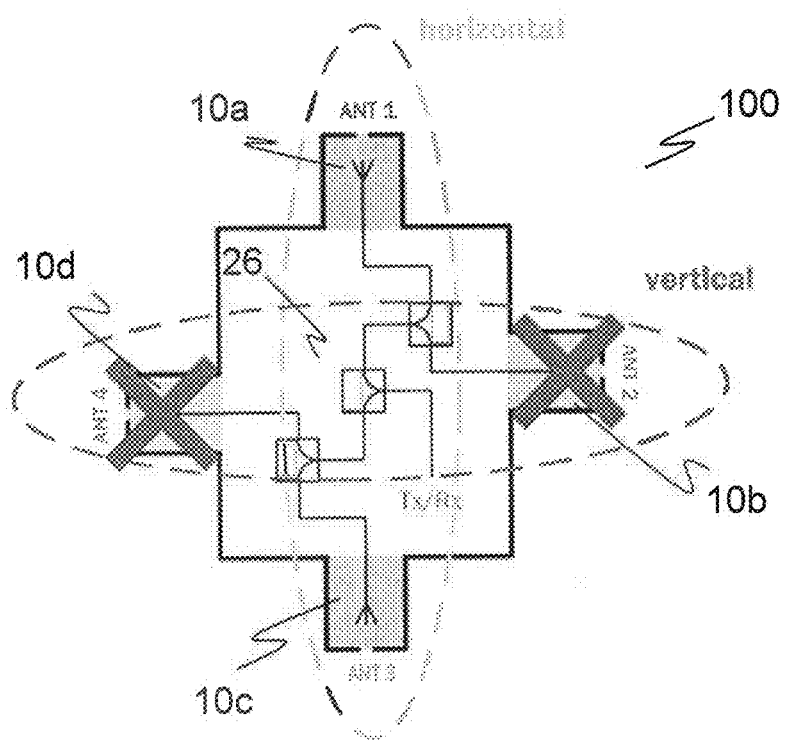
Figure 10:
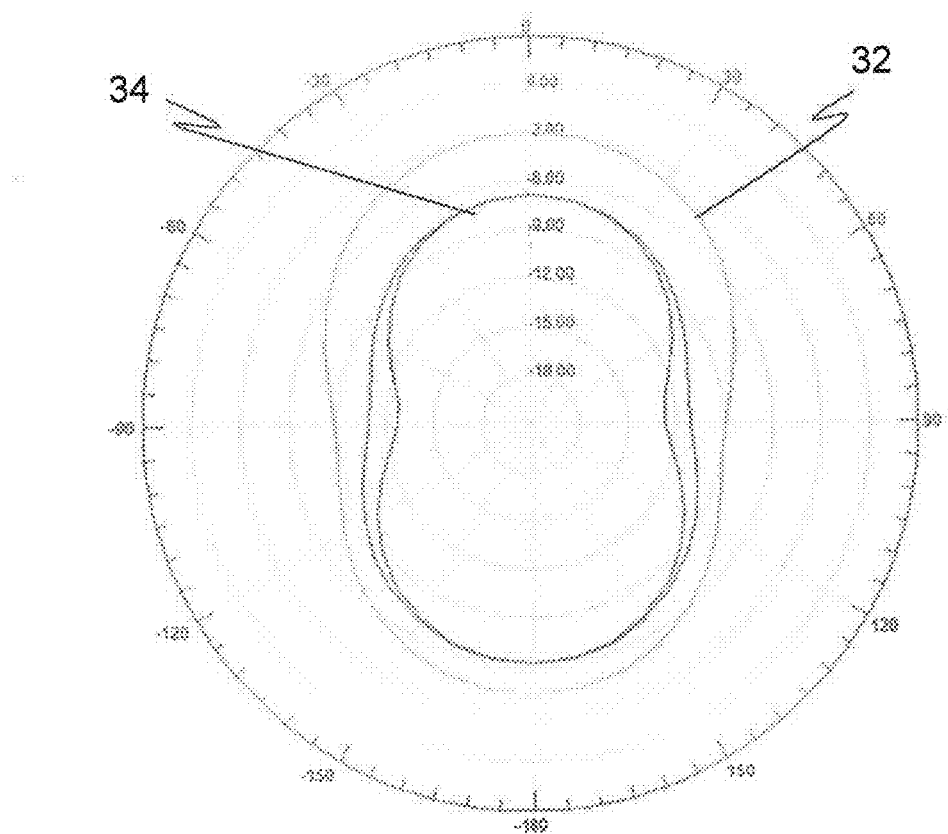
Figure 11:
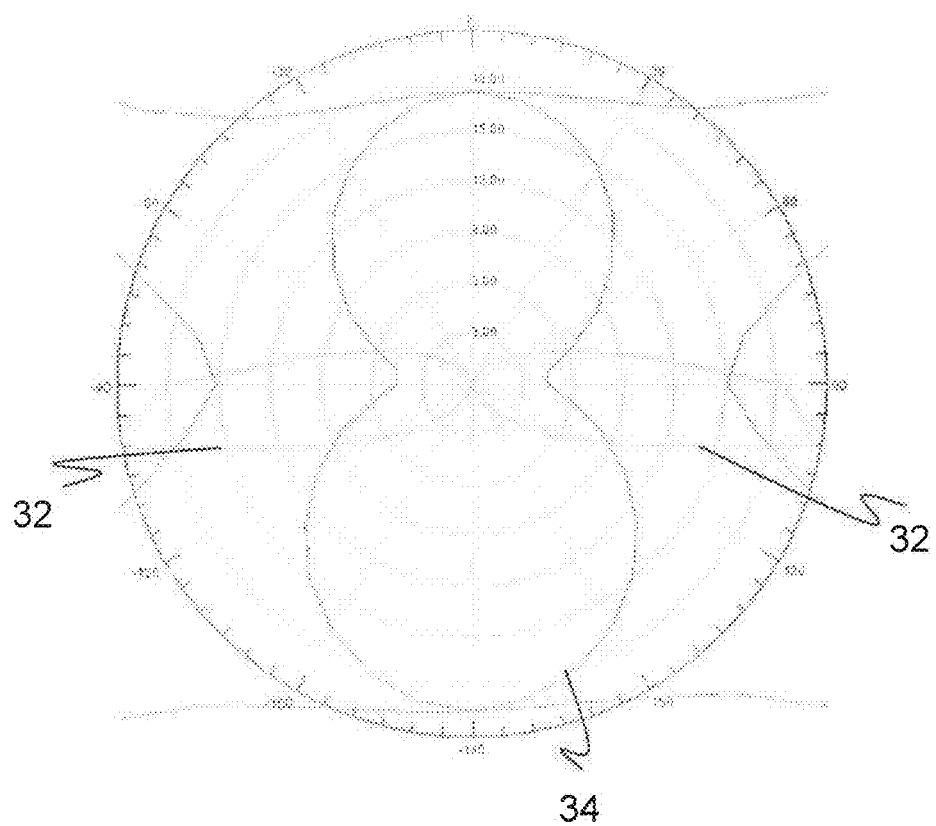

The invention will be explained in more detail in the following also with respect to further features and advantages by way of example with reference to embodiments and to the enclosed drawing. The Figures of the drawing show in:

FIG. 1 a schematic representation of an single CLL antenna;

FIG. 2 a block diagram of a circularly polarized antenna of two single CLL antennas with feed network;

FIG. 3 a block diagram of a circularly polarized antenna of four single CLL antennas with feed network;

FIG. 4 a block diagram of a generalized antenna with n single CLL antennas;

FIG. 5 a three-dimensional view of an exemplary geometry of an antenna with four single CLL antennas in a horizontal alignment;

FIG. 6 a three-dimensional view similar to FIG. 5, but with a vertical alignment of the four single CLL antennas;

FIG. 7 a representation of a right-hand circularly polarized antenna of four single CLL antennas in which the feed point is beneath the contact point to the frame;

FIG. 8 a representation similar to FIG. 7, but for a left-hand circularly polarized antenna with single CLL antennas arranged upside down with respect to FIG. 7;

FIG. 9 a block diagram of an antenna of four single CLL antennas of which some are highly detuned to change the polarization properties;

FIG. 10 a radiation diagram of the antenna gain to illustrate the effects of a direct detuning of single CLL antennas; and FIG. 11 a polar diagram of the axial ratio to illustrate the effects of a direct detuning of single CLL antennas.

FIG. 1 shows a schematic representation of the design of a single CLL (capacitively loaded loop) antenna 10. It has an inner antenna loop 12 and a CLL or capacitively loaded conductor loop 14 surrounding the inner antenna loop 12. A capacitance 16 is introduced into the surrounding conductor loop 14. The surrounding conductor loop 14 is, for example, configured as a metal frame and the capacitance 16 as a gap therein. Alternatively, a separate capacitor is used as the capacitance 16.

The inner antenna loop 12 is U-shaped in this embodiment. Independently of the specific loop geometry, the inner antenna loop 12 has a first end point 18 that is connected to a feed line 20 and a second end point 22 that is connected to a ground plane 24. The surrounding conductor loop 14 is also U-shaped and is connected to the ground plane 24 at both end points, wherein a metallic frame of the single CLL antenna 10 is simultaneously formed. The ring-shaped structure around the inner antenna loop 12 takes up the magnetic flux and amplifies it. The principle corresponds to that that was discussed in the introduction with respect to the prior art of CLLs.

The single CLL antenna 10 overall has a very compact construction design, also a planar design, in the specific embodiment. The bandwidth is first considerably less, both for the S11 matching and for the gain over frequency, in comparison with antennas previously used in RFID reading apparatus. The resonant frequency can, however, be adapted by varying the capacitance value of the capacitance 16.

This is not only initially possible in the design by a suitable selection of the capacitance 16, but also even by controlling in operation if a variable capacitance 16 is used such as a varactor diode or a digitally controllable integrated capacitor circuit. A direct frequency change can thereby equally be made such as an adaptation to the respective deployment environment.

FIG. 2 shows a block diagram of a circularly polarized antenna 100 that is combined from two single CLL antennas 10a-b. The respective single CLL antennas 10a-b are set up, for example, as just explained with respect to FIG. 1. A single CLL antenna 10a-b is only suitable with great limitations for use in an RFID reading apparatus due to its linear polarization. This disadvantage is canceled by the combination of a plurality of single CLL antennas 10a-b, whereby a desired polarization, in particular a circular polarization, can be achieved.

The two single CLL antennas 10a-b are tilted by 90° with respect to one another. They are operated with the same input signal and with a 90° phase offset with the aid of a feed network 26 that has a 90° power divider to generate the circular polarization.

FIG. 3 shows a block diagram of a further circularly polarized antenna 100 for an RFID reading apparatus that differs from FIG. 2 in that now four single CLL antennas 10a-d are combined. The single CLL antennas 10a-d are each respectively tilted by 90° with respect to one another and the feed network 26 now has a plurality of 90° power dividers 28a-c, three here, to operate the single CLL antennas 10a-d to generate the circular polarization with the same received signal and respective phase offset of 90°.

As illustrated in FIG. 4, this principle can be generalized from two or four single CLL antennas to n single CLL antennas. These single CLL antennas are tilted with respect to one another such that they evenly divide 360°. A corresponding power divider network or feed network 26 supplies the single CLL antennas 10 with the matching phase. The axial ratio can be further reduced and can be made more robust toward changes of the environment by the use of additional single CLL antennas. Only the compact design of the single CLL antennas 10 allows such variations at all in which a plurality of single elements are accommodated in a compact common housing.

FIGS. 5 and 6 each show a three-dimensional view of an exemplary geometry of an antenna 100 having four single CLL antennas 10a-d. Functionally, this corresponds to the embodiment in accordance with FIG. 3. In the combination of four single CLL antennas 10a-d in one housing, there is the possibility of arranging the single CLL antennas 10a-d in parallel with a common base surface 30 or perpendicular thereto. A horizontal arrangement such as in FIG. 5 or, alternatively, a perpendicular arrangement such as in FIG. 6 result from this. The common base surface 30 preferably also serves as the ground plane of the antenna 100 that is conductively connected to the respective ground planes 24 of the single CLL antennas 10a-d.

The horizontal arrangement such as in FIG. 5 allows a flatter antenna 100. In the vertical arrangement in accordance with FIG. 6, however, a smaller resulting axial ratio can be achieved. The geometrical and functional demands should therefore be weighed up for the selection between the two construction designs.

It has been found for the vertical arrangement that the axial ratio can be further improved if the alignment of the first endpoint 18 of the inner antenna loop 12 connected to the feed line 20 is considered. This alignment should be selected in accordance with the hand direction of the circular polarization for an ideal, that is small, axial ratio of the antenna 100, with the hand direction in turn being fixed by the respective phase difference in the control of the single CLL antennas 10a-d.

This is illustrated in FIGS. 7 and 8. FIG. 7 shows a right-hand circularly polarized antenna 100. The single CLL antenna 10a-d there, and thus the inner antenna loop 12, is oriented such that the first end point 18 is beneath the second end point 33. The feed point of the inner antenna loop 12 is therefore beneath the contact point to the ground plane 24.

FIG. 8 shows a left-hand circularly polarized antenna 100 in which the single CLL antennas 10a-d are actually upside down in comparison with FIG. 7, i.e. with the first end point 18 above the second end point 22. The axial ratio can be further improved in that the relationship of the orientation of the single CLL antennas 10a-d and the hand direction of the polarization illustrated in FIGS. 7 and 8 is taken into account.

FIG. 9 again shows a block diagram of an antenna 100 of four single CLL antennas 10a-d, similar to FIG. 3. It should thereby be illustrated that, in a preferred embodiment, the polarization of the antenna 100 can be varied by a direct detuning of selected single CLL antennas 10a-d. Specifically in the example, oppositely disposed single CLL antennas 10b, 10d or 10a, 10c are detuned as much as possible by a corresponding adaptation of their capacitance 16.

On an operation of all four single CLL antennas 10a-d at the same transmission power and at a 90° phase offset with respect to one another, a circular polarization having a very good axial ratio of <1 dB can be achieved in the main emission direction. If now, for example, the capacitance value of the capacitance 16 is directly varied at the single CLL antennas, for example by 30%, this results in a resonant frequency higher by approximately 20% at these single CLL antennas 10b, 10d. The adaptation of the single CLL antenna 10b, 10d at the transmission frequency thus becomes so poor that only a small fraction of the previously emitted signal is transmitted. The transmitted signal that reaches the detuned single CLL antennas 10b, 10d through the power divider 28a-c is almost completely reflected due to the poor adaptation and is converted into heat in the final resistors of the power dividers 28a-c.

The greater part of the emission now only takes place over the other two, non-detuned single CLL antennas 10a, 10c. The change becomes recognizable in a clearly increased axial ratio that increases in simulations from <1 dB to >17 dB in the main direction of emission and in a smaller antenna gain.

Effectively, a highly elliptical, approximately linear polarization is achieved instead of the original circular polarization. In this respect, a horizontal or a vertical polarization is possible by a selection of the detuned antenna pair 10b, 10d or 10a, 10c.

FIGS. 10 and 11 further illustrate the effects of the direct detuning of two single CLL antennas 10b, 10d. In this respect, FIG. 10 is an emission diagram of the antenna gain (realized gain total in dBiC) for the operation of all four single CLL antennas 10a-d as a reference (outer line 32) and with a direct detuning of the two single CLL antennas 10b, 10d (inner line 34). FIG. 11 shows a corresponding polar diagram of the axial ratio of the antenna, likewise in comparison, in operation of all four single CLL antennas 10a-d (line 32) as a reference and with a direct detuning of the two single CLL antennas 10b, 10d (line 34).

The antenna gain of the antenna 100 on a combination of all four single CLL antennas 10a-d would theoretically have to be 3 dB below the gain of the antennas in normal operation with the same detuning with a direct detuning of the single CLL antennas 10b, 10d. In simulations, with this constellation, a gain smaller by approximately 4 dB resulted, with this additional loss being able to be explained by effects in the power divider network 26. Since most RFID transponders are anyway linearly polarized, an RFID transponder aligned perpendicular, i.e. in the axis of the non-detuned CLL antennas 10a, 10c, would still receive approximately the same amount of energy as with a circular polarization. RFID transponders in the other, horizontal, alignment would, however, be able to use considerably less energy from the transmitted field of the RFID reading apparatus. A wake-up of such RFID transponders and thus a communication would therefore be considerably more unlikely. In this manner, an unwanted reading of adjacent transponders with the non-matching alignment can be reduced for specific applications with a known transponder alignment. For the RFID reading apparatus, this means fewer RFID transponders that have to be queried in the same reading period and thus a higher reading rate and a better recognition probability.

The invention claimed is:

1. An antenna for an RFID reading apparatus having at least one single CLL antenna, wherein a single CLL antenna is an antenna that has an inner antenna loop and a capacitively loaded antenna loop which surrounds the inner antenna loop and into which a capacitance is introduced, wherein the antenna has a plurality of single CLL antennas that are differently oriented and has a feed circuit to operate the single CLL antennas for generating a circular polarization with a respective phase offset.

2. The antenna in accordance with claim 1,
wherein the single CLL antenna has a ground plane that is connected to at least one of the inner antenna loop and the surrounding conductor loop.

3. The antenna in accordance with claim 1,
wherein the inner antenna loop is U-shaped, with a first end point being connected to a feed line and a second end point being connected to a ground plane.

4. The antenna in accordance with claim 3,
wherein the antenna is right-handed circularly polarized and the plurality of single CLL antennas are oriented with respect to a common base surface such that the first end point is spaced further away from the base surface than the second end point.

5. The antenna in accordance with claim 3,
wherein the antenna is left-handed circularly polarized and the plurality of single CLL antennas are oriented with respect to the common base surface such that the first end point is spaced closer with respect to the base surface than the second end point.

6. The antenna in accordance with claim 1,
wherein the surrounding capacitively loaded conductor loop is U-shaped and is connected to a ground plane at both end points.

7. The antenna in accordance with claim 1,
wherein the capacitance introduced into the surrounding capacitively loaded conductor loop is electrically adjustable.

8. The antenna in accordance with claim 1,
wherein the inner antenna loop and the surrounding capacitively loaded conductor loop of the single CLL antenna are arranged in one plane.

9. The antenna in accordance with claim 1,
wherein the plurality of single CLL antennas are arranged on a common base surface.

10. The antenna in accordance with claim 1,
wherein the antenna has two single CLL antennas that are each oriented at a 90° angle with respect to one another; and wherein the feed circuit operates the two single CLL antennas with a respective phase offset of 90°.

11. The antenna in accordance with claim 10,
wherein the feed circuit has a 90° power divider.

12. The antenna in accordance with claim 1,
wherein the antenna has four single CLL antennas that are each oriented at a 90° angle with respect to one another;

and wherein the feed circuit operates the four single CLL antennas with a respective phase offset of 90°.

13. The antenna in accordance with claim 12, wherein the feed circuit has a plurality of 90° power dividers.

14. The antenna in accordance with claim 12, wherein the plurality of single CLL antennas are each aligned perpendicular to a plane and in the shape of a cross with respect to one another.

15. The antenna in accordance with claim 1, wherein the plurality of single CLL antennas are arranged in one plane.

16. The antenna in accordance with claim 1, wherein the capacitance of the surrounding capacitively loaded conductor loop of at least one of the plurality of single CLL antennas is detuned to vary the polarization.

17. The antenna in accordance with claim 16, wherein the capacitance of the surrounding capacitively loaded conductor loop of the at least one of the plurality of single CLL antennas is maximally detuned.

18. The antenna in accordance with claim 12, wherein the capacitance of the surrounding capacitively loaded conductor loop of two diagonally oppositely disposed single CLL antennas is detuned to set an elliptical polarization.

19. The antenna in accordance with claim 18, wherein the capacitance of the surrounding capacitively loaded conductor loop of two diagonally oppositely disposed single CLL antennas is maximally detuned.

20. A method for transmitting and/or receiving RFID signals comprising an antenna that has at least one single CLL antenna, wherein a single CLL antenna is an antenna that has an inner antenna loop and a capacitively loaded conductor loop which surrounds the inner antenna loop and into which a capacitance is introduced, wherein a circular polarization is produced in that a plurality of single CLL antennas of the antenna that are differently oriented are operated by a feed circuit having a respective phase offset.

* * * * *